Patented Oct. 31, 1933

1,932,939

UNITED STATES PATENT OFFICE 1,932,939

PROCESS FOR THE PRODUCTION AND TREATMENT OF NITRATES

Ludwig Rosenstein, San Francisco, Calif., assignor to Shell Development Company, San Francisco, Calif., a corporation of Delaware No Drawing. Application March 10, 1931
Serial No. 521,607

12 Claims. (Cl. 23—102)

This invention relates to a process for separating inorganic nitrates from their admixture with other inorganic compounds and more particularly is concerned with the separation of inorganic nitrates from their corresponding halides by treatment with anhydrous liquid ammonia.

I have discovered that I can effectively separate inorganic nitrates, particularly those of the alkali-metal and alkaline earth-metal groups, although the invention is not limited thereto, from their admixture with other inorganic compounds, including salts, by treating the mixture with anhydrous liquid ammonia at appropriate temperatures. Any convenient mode of contacting a wash-fluid with a solid may be adopted in carrying out my invention. By washing the solid mixture with anhydrous liquid ammonia, I find that the nitrogeneous solvent takes up the nitrate, leaving behind the rest of the solid mixture. The temperatures and pressures made use of in my process may be conveniently regulated to satisfy the operating requirements. In other words, by adjusting the temperature and pressure factors to points predetermined by operating conditions—which are dependent upon the number, concentration and type of the constituents present in the mixture to be treated— one can obtain, on washing the inorganic mixture with anhydrous liquid ammonia, an ammoniacal solution of substantially pure inorganic nitrate. The washing or extraction step can be repeated as many times as is necessary to effect complete separation of the nitrates. Pure anhydrous liquid ammonia may be used or saturated solutions of anhydrous liquid ammonia may be utilized, the solution being saturated with one or more inorganic compounds which are relatively less soluble than the nitrates to be solvated. After washing, the resulting ammoniacal solution containing nitrates as solute is separated from the undissolved inorganic compounds by gravity, filtration, decantation, or the like. The nitrates can be readily recrystallized from the anhydrous liquid ammonia by lowering the temperature of the latter to below the point at which nitrate crystals begin to form. Or the nitrates may be recovered from their ammoniacal solution by any convenient mode of vaporization of the ammonia, for example, by evaporation or distillation. In the first instance where nitrates are recrystallized by a decrease in temperature, the decrystallized liquid ammonia can be reheated to its former temperature and the process repeated. In the second instance of recovery, the evolved ammonia gas may be recompressed and cycled over the solid mixture being treated—thus constituting a continuous process.

I have found it preferable that the solid mixture be in a substantially anhydrous state—as the efficacy of the removal operation is somewhat diminished by the presence of water. Thus, if solid mixtures such as Chile saltpeter or the like are found to possess water in some form or other, it is desirable to remove such water by heat treatment or otherwise before washing the same with anhydrous liquid ammonia.

By the expression "anhydrous liquid ammonia" is meant the liquid ammonia of commerce which is substantially 100% $NH_3$ but contains traces of moisture and other impurities.

I have discovered in reacting oxides of nitrogen with inorganic halides to obtain the corresponding nitrates, that it is not always possible to effect a complete conversion of halide to nitrate. When such condition exists, I find that the inorganic nitrate can be dissolved from the corresponding unconverted halide by washing the nitrate-halide mixture with anhydrous liquid ammonia as many times as is necessary at a temperature low enough to prevent the solution of the halide, removing the ammoniacal solution by any suitable method, evolving the ammonia gas by any desirable volatilization operation, thus leaving behind the substantially pure inorganic nitrate, oxidizing the ammonia gas to a suitable oxide of nitrogen or compressing the ammonia gas to anhydrous liquid ammonia, or oxidizing part of the gas and compressing part of the gas and returning the same to the system at the necessary points; thus I have a self-contained process wherein a substantially 100% conversion of inorganic halides to nitrates is guaranteed. Instead of volatilizing the liquid ammonia, I can recrystallize the nitrates by lowering the temperature of the liquid ammonia to a point at which nitrate crystals come out of solution. The crystallized liquid ammonia can be reheated and used again on the inorganic mixture, as disclosed previously. The process may be one of a completely anhydrous character or the halides may exist in solution. If the latter procedure is adopted, it is necessary that the resulting nitrate-halide mixture first be treated to substantially remove all the water before washing with anhydrous liquid ammonia.

The nitrogen oxides may exist either in the liquid or gaseous phase. Any of the oxides of nitrogen may be utilized in my process, and by nitrogen oxide, I contemplate such compounds as nitrogen peroxide $NO_2$, nitrous anhydride $N_2O_3$, nitrogen tetroxide and nitrogen pentoxide. Two or more of the oxides may be used concurrently if so desired.

The term "alkalinous" wherever employed is intended to embrace those elements of an alkaline character such as those of the alkali-metal and alkaline earth-metal groups.

While I have in the foregoing described in some detail the preferred embodiment of my invention and some variants thereof, it will be understood that this is only for the purpose of making the invention more clear and that the invention is not to be regarded as limited to the details of operation described, nor is it dependent upon the soundness or accuracy of the theories which I have advanced as to the reasons for the advantageous results attained. On the other hand, the invention is to be regarded as limited only by the terms of the accompanying claims, in which it is my intention to claim all novelty inherent therein as broadly as is possible in view of the prior art.

I claim as my invention:

1. The steps of reacting an oxide of nitrogen higher than nitric oxide in the substantially anhydrous state with an inorganic halide in the substantially anhydrous state to form the corresponding nitrate, treating the mixture of nitrate and unconverted halide with substantially anhydrous liquid ammonia to dissolve the nitrate formed, separating the ammoniacal solution from the undissolved halide and recovering substantially pure inorganic nitrate.

2. The steps of reacting a substantially anhydrous liquid oxide of nitrogen higher than nitric oxide with a substantially anhydrous solid inorganic halide to form the corresponding nitrate, treating the mixture of nitrate and unconverted halide with substantially anhydrous liquid ammonia to dissolve the nitrate formed, separating the ammoniacal solution from the undissolved halide and recovering a substantially pure inorganic nitrate.

3. The steps of reacting a substantially anhydrous liquid oxide of nitrogen higher than nitric oxide with a substantially anhydrous, inorganic halide to form the corresponding nitrate, treating the mixture of nitrate and unconverted halide with substantially anhydrous liquid ammonia to dissolve the nitrate formed, separating the ammoniacal solution from the undissolved halide and recovering substantially pure inorganic nitrate.

4. The steps of reacting a substantially anhydrous liquid oxide of nitrogen higher than nitric oxide in the substantially anhydrous state with an alkalinous metal halide in the substantially anhydrous state to form the corresponding nitrate, treating the mixture of nitrate and unconverted halide with substantially anhydrous liquid ammonia to dissolve the nitrate formed, separating the ammoniacal solution from the undissolved halide and recovering substantially pure alkalinous metal nitrate.

5. The steps of reacting a substantially anhydrous liquid oxide of nitrogen higher than nitric oxide with a substantially anhydrous solid alkalinous metal halide to form the corresponding nitrate, treating the mixture of nitrate and unconverted halide with substantially anhydrous liquid ammonia to dissolve the nitrate formed, separating the ammoniacal solution from the undissolved halide and recovering substantially pure alkalinous metal nitrate.

6. The steps of reacting a substantially anhydrous liquid oxide of nitrogen higher than nitric oxide with a substantially anhydrous, alkalinous metal halide to form the corresponding nitrate, treating the mixture of nitrate and unconverted halide with substantially anhydrous liquid ammonia to dissolve the nitrate formed, separating the ammoniacal solution from the undissolved halide and recovering substantially pure alkalinous metal nitrate.

7. The steps of reacting a substantially anhydrous oxide of nitrogen higher than nitric oxide in the substantially anhydrous state with an alkali-metal halide in the anhydrous state to form the corresponding nitrate, treating the mixture of nitrate and unconverted halide with substantially anhydrous liquid ammonia to dissolve the nitrate formed, separating the ammoniacal solution from the undissolved halide and recovering substantially pure alkali-metal nitrate.

8. The steps of reacting a substantially anhydrous liquid oxide of nitrogen higher than nitric oxide with a substantially anhydrous solid alkali-metal halide to form the corresponding nitrate, treating the mixture of nitrate and unconverted halide with substantially anhydrous liquid ammonia to dissolve the nitrate formed, separating the ammoniacal solution from the undissolved halide and recovering substantially pure alkali-metal nitrate.

9. The steps of reacting a substantially anhydrous oxide of nitrogen higher than nitric oxide with a substantially anhydrous alkali-metal halide to form the corresponding nitrate, treating the mixture of nitrate and unconverted halide with substantially anhydrous liquid ammonia to dissolve the nitrate formed, separating the ammoniacal solution from the undissolved halide and recovering substantially pure alkali-metal nitrate.

10. The steps of reacting a substantially anhydrous oxide of nitrogen higher than nitric oxide with an alkali-metal chloride in the anhydrous state to form the corresponding nitrate, treating the mixture of nitrate and unconverted chloride with substantially anhydrous liquid ammonia to dissolve the nitrate formed, separating the ammoniacal solution from the undissolved chloride and recovering substantially pure alkali-metal nitrate.

11. The steps of reacting a substantially anhydrous liquid oxide of nitrogen higher than nitric oxide with a substantially anhydrous solid alkali-metal chloride to form the corresponding nitrate, treating the mixture of nitrate and unconverted chloride with substantially anhydrous liquid ammonia to dissolve the nitrate formed, separating the ammonical solution from the undissolved chloride and recovering substantially pure alkali-metal nitrate.

12. The steps of reacting a substantially anhydrous liquid oxide of nitrogen higher than nitric oxide with a substantially anhydrous alkali-metal chloride to form the corresponding nitrate, treating the mixture of nitrate and unconverted chloride with substantially anhydrous liquid ammonia to dissolve the nitrate formed, separating the ammoniacal solution from the undissolved chloride and recovering substantially pure alkali-metal nitrate.

LUDWIG ROSENSTEIN.